(12) United States Patent
Bansal et al.

(10) Patent No.: US 10,459,631 B2
(45) Date of Patent: Oct. 29, 2019

(54) MANAGING DELETION OF LOGICAL OBJECTS OF A MANAGED SYSTEM

(71) Applicant: NICIRA, INC., Palo Alto, CA (US)

(72) Inventors: Kaushal Bansal, Pleasanton, CA (US); Medhavi Dhawan, Cupertino, CA (US)

(73) Assignee: Nicira, Inc., Palo Alto, CA (US)

( * ) Notice: Subject to any disclaimer, the term of this patent is extended or adjusted under 35 U.S.C. 154(b) by 172 days.

(21) Appl. No.: 15/472,026

(22) Filed: Mar. 28, 2017

(65) Prior Publication Data
US 2018/0284985 A1    Oct. 4, 2018

(51) Int. Cl.
*G06F 12/00* (2006.01)
*G06F 3/06* (2006.01)
*G06F 9/455* (2018.01)

(52) U.S. Cl.
CPC ............ *G06F 3/0604* (2013.01); *G06F 3/067* (2013.01); *G06F 3/0652* (2013.01); *G06F 9/45558* (2013.01); *G06F 2009/45562* (2013.01); *G06F 2009/45579* (2013.01); *G06F 2009/45595* (2013.01)

(58) Field of Classification Search
None
See application file for complete search history.

(56) References Cited

U.S. PATENT DOCUMENTS

| 7,290,019 | B2 | 10/2007 | Bjørner et al. |
| 8,346,820 | B2 | 1/2013 | Kesselman et al. |
| 9,081,841 | B2 | 7/2015 | Kesselman et al. |
| 9,262,275 | B2 | 2/2016 | Gokhale et al. |
| 2010/0070734 | A1* | 3/2010 | Agombar .............. G06F 3/0608 711/171 |
| 2012/0324170 | A1* | 12/2012 | McKenney ......... G06F 12/0891 711/135 |
| 2014/0173226 | A1* | 6/2014 | Gold ................ G06F 17/30117 711/159 |
| 2016/0283370 | A1* | 9/2016 | Kumpera ............ G06F 12/0269 |
| 2016/0294614 | A1* | 10/2016 | Searle .................... G06F 8/654 |

* cited by examiner

*Primary Examiner* — Jason W Blust

(57) ABSTRACT

In a computer-implemented method for managing deletion of logical objects, a request to delete a logical object of a managed system is received, wherein the logical object is referenced by a second logical object, and wherein deletion of the logical object does not result in deletion of the second logical object. The logical object is marked as deleted such that the logical object is unavailable for reference by the second logical object. The logical object and data associated with the logical object are maintained in a memory space of the managed system for access by a module of the managed system, such that the memory space is unavailable for any other use by the managed system.

18 Claims, 6 Drawing Sheets

MANAGING DELETION OF LOGICAL OBJECTS OF A MANAGED SYSTEM

BACKGROUND

For many types of virtualized environments, software defined networking (SDN) managers are used to manage operations. SDN managers provide configuration management for components (e.g., hosts, virtual servers, virtual machines (VMs), data end nodes, etc.) of the virtualized environment. Logical objects represent system components used by an SDN manager in managing the virtual environment (e.g., for managing a virtual network). Logical objects may be managed, such that the life cycle of the logical object is controlled by the SDN manager, or non-managed, such that the life cycle of the logical object is not managed by the SDN manager.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

Figure 1:
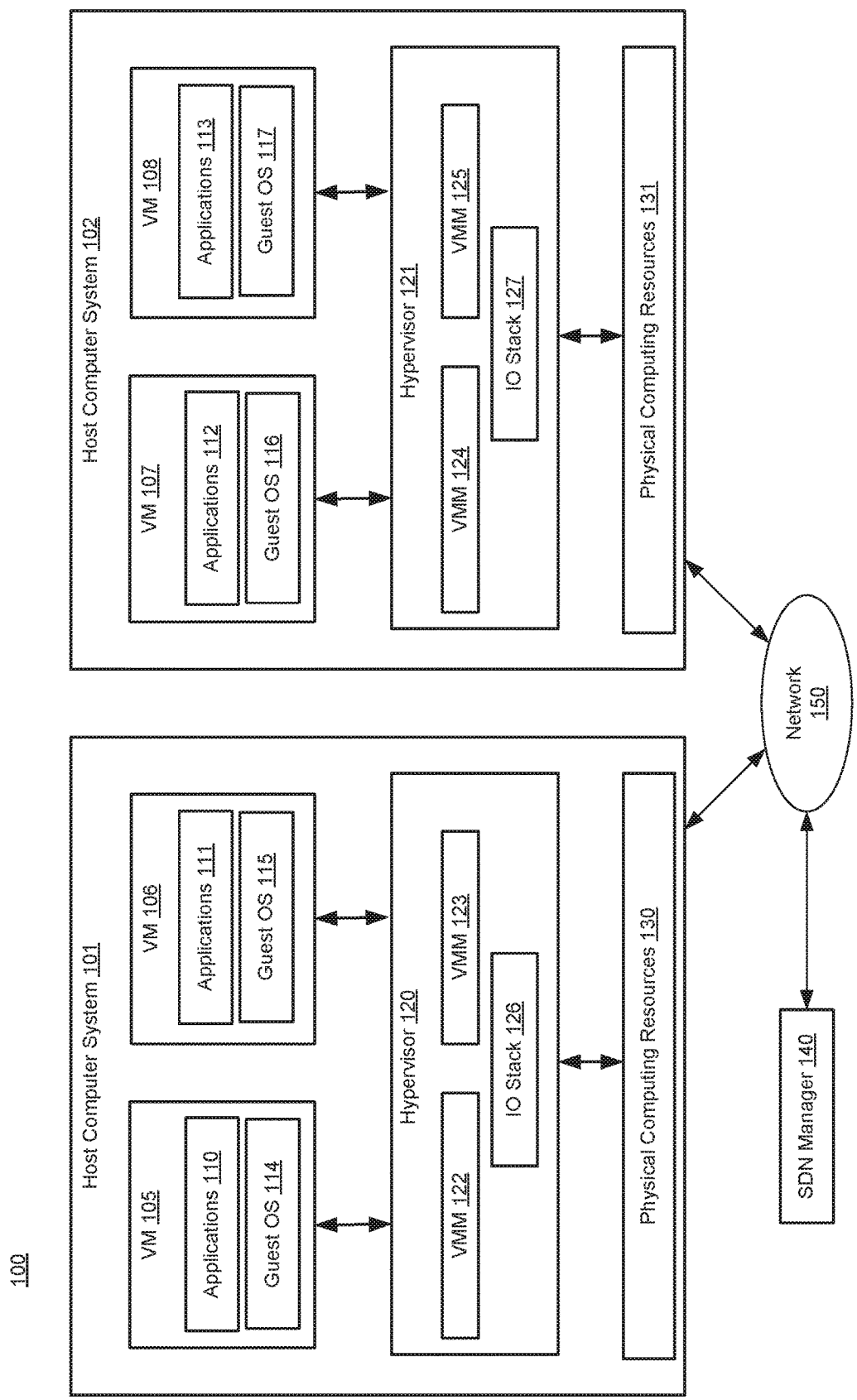
FIG. 1 shows an example software defined network (SDN) upon which embodiments of the present invention can be implemented.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

NOTATION AND NOMENCLATURE

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "receiving," "marking," "maintaining," "deleting," "generating," "accessing," "restoring," or the like, refer to the actions and processes of an electronic computing device or system such as: a host processor, a processor, a memory, a hyper-converged appliance, a software defined network (SDN) manager, a system manager, a virtualization management server or a virtual machine (VM), among others, of a virtualization infrastructure or a computer system of a distributed computing system, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

OVERVIEW OF DISCUSSION

Example embodiments described herein improve the performance (e.g., serviceability and correctness) of computer systems by improving the management of deleted logical objects in a managed system. In accordance with the described embodiments, logical objects refer to data structures that are representative of attributes of components or logical entities of a system. For example, logical objects may include attributes of a component, configuration settings, or state information of a component or logical entity.

In accordance with some embodiments, a request to delete a logical object of a managed system is received, wherein the logical object is referenced by a second logical object, and wherein deletion of the logical object does not result in deletion of the second logical object. The logical object is marked as deleted such that the logical object is unavailable for reference by the second logical object. The logical object and data associated with the logical object are maintained in a memory space of the managed system for access by a module (e.g., a configuration manager) of the managed system, such that the memory space is unavailable for any other use by the managed system.

In one embodiment, the maintaining the logical object and data associated with the logical object in a memory space of the managed system for access by the module of the managed system includes deleting the logical object from a user region (e.g., a volatile memory cache) associated with the managed system. The logical object and the data associated with the logical object are maintained in a system region (e.g., a persistent datastore) associated with the managed system. In one embodiment, the managed system includes a plurality of nodes, where a node of the plurality of nodes is configured to host at least one module of a plurality of modules, and the user region and the system region are accessible across the plurality of nodes by the plurality of modules via a data access layer.

In one embodiment, a notification that the logical object is marked for deletion is generated, wherein the notification is for consumption by the module of the managed system. The notification is received at the module of the managed system. In one embodiment, the logical object is accessed by the module for performing an operation associated with the module (e.g., operations related to serviceability and correctness of the system).

In one embodiment, in which the module is an audit configuration manager (CM), the logical object and the data associated with the logical object are accessed to generate an audit log including the logical object and the data associated with the logical object. For example, the audit configuration manager may require a current state and a previous state of the logical object. In one embodiment, in which the module is a system state configuration manager, the logical object and the data associated with the logical object are accessed to compute an effective realized state of the managed system using the logical object and the data associated with the logical object. In one embodiment, in which the module is a system state configuration manager, the logical object and the data associated with the logical object are accessed to compute anomalies in a desired state of the managed system using the logical object and the data associated with the logical object. In one embodiment, in which the module is a data backup configuration manager, the logical object and the data associated with the logical object.

In one embodiment, responsive to satisfaction of a deletion condition, the logical object and data associated with the logical object are deleted from the managed system. In one embodiment, the deletion condition includes a number of logical objects of the managed system exceeding a threshold value and the logical object being oldest of the logical objects of the managed system. In one embodiment, the deletion condition includes a number of logical objects of the managed system exceeding a threshold value and the logical object having lowest weighted value of the logical objects of the managed system. In one embodiment, a weighted value of the logical object is based at least in part on the module for accessing the logical object. In one embodiment, a weighted value of the logical object is based at least in part on a number of references to the logical object by other logical objects of the managed system.

In accordance with various embodiments, the managed system includes a virtualized environment. For many types of virtualized environments implementing virtual networking, software defined networking (SDN) managers, such as VMware Inc.'s NSX Manager, are used to manage operations. SDN managers provide configuration management for components (e.g., hosts, virtual servers, VMs, data end nodes, etc.) of the virtualized environment. To effectuate management of the SDN, SDN managers are configured to manage and/or utilize logical objects (e.g., managed logical objects and non-managed logical objects). Logical objects with a virtualized environment (e.g., a virtualization infrastructure) may make reference to or be referenced by other logical objects. In some instances, where a logical object referenced by another logical object is deleted, inconsistencies in the SDN may result.

Embodiments described herein provide for improved management of deleted logical objects. For example, rather than simply deleting a logical object from the managed system upon receiving a request to delete the logical object, the logical object is marked for deletion. Once marked for deletion, the logical object is made unavailable for reference by another logical object. However, the logical object remains in the system (e.g., in a memory space of the managed system) for access by other modules of the managed system.

For example, a logical object marked for deletion may be accessed by an audit configuration manager. Accordingly, an audit log that documents the contents of the logical object marked for deletion can be generated, providing the appropriate system administrator with information pertaining to the logical object that was marked for deletion.

Example System for Managing Deletion of Logical Objects of a Managed System

Example embodiments described herein provide systems and methods for managing deletion of logical objects of a managed system. In accordance with some embodiments, a request to delete a logical object of a managed system is received, wherein the logical object is referenced by a second logical object, and wherein deletion of the logical object does not result in deletion of the second logical object. The logical object is marked as deleted such that the logical object is unavailable for reference by the second logical object. The logical object and data associated with the logical object are maintained in a memory space of the managed system for access by a module of the managed system, such that the memory space is unavailable for any other use by the managed system.

FIG. 1 shows an example software defined network (SDN) 100 upon which embodiments of the present invention can be implemented. Software defined networking allows for virtual networking and security operations in a virtualization infrastructure. As illustrated, SDN 100 includes host computer system 101 and host computer system 102 that are communicatively coupled to SDN manager 140 via network 150. Host computer systems 101 and 102 are configured to implement virtual networks that are logical constructs that are decoupled from the underlying hardware. Virtual networks provide a software-based view of networking resources (e.g., logical ports, logical switches, logical routers, etc.) that are logical instances of entities used within a virtual network for handling network operations. While network hardware (e.g., physical computing resources 130 and 131) are responsible for the communication of data packets, a virtual network, under the control of SDN manager 140 and hypervisors 120 and 121, provides networking services. While SDN 100 is illustrated with two host computer systems, each implementing two virtual machines, it should be appreciated that embodiments described herein may utilize any number of host computer systems implementing any number of virtual machines. Moreover, while embodiments of the present invention are described within the context of SDN for implementing a virtualization infrastructure, it should be appreciated that embodiments of the present invention may be implemented within any managed system including logical objects or data objects.

Virtualized computer systems are implemented in host computer system 101 including physical computing resources 130 and host computer system 102 including physical computing resources 131. In one embodiment, host computer systems 101 and 102 are constructed on a conventional, typically server-class, hardware platform.

In accordance with various embodiments, physical computing resources 130 and 131 include one or more central processing units (CPUs), system memory, and storage. Physical computing resources 130 and 131 may also include one or more network interface controllers (NICs) that connect host computer systems 101 and 102 to network 150, and one or more host bus adapters (HBAs) that connect host computer systems 101 and 102 to a persistent storage unit.

Hypervisor 120 is installed on top of physical computing resources 130 and hypervisor 121 is installed on top of physical computing resources 131. Hypervisors 120 and 121 support a virtual machine execution space within which one or more virtual machines (VMs) may be concurrently instantiated and executed. Each virtual machine implements a virtual hardware platform that supports the installation of a guest operating system (OS) which is capable of executing applications. For example, virtual hardware for virtual machine 105 supports the installation of guest OS 114 which is capable of executing applications 110 within virtual machine 105. Similarly, virtual machine 106 supports the installation of guest OS 115 which is capable of executing applications 111 within virtual machine 106, virtual machine 107 supports the installation of guest OS 116 which is capable of executing applications 112 within virtual machine 107, and virtual machine 108 supports the installation of guest OS 117 which is capable of executing applications 113 within virtual machine 108.

Guest OS 114 may be any operating system, such as a well-known commodity operating system, and includes a native file system layer, for example, either a New Technology File System (NTFS) or an ext3FS type file system layer. Input/outputs (IOs) issued by guest OS 114 through the native file system layer appear to guest OS 114 as being routed to one or more virtual disks provisioned for virtual machine 105 for final execution, but such IOs are, in reality, reprocessed by IO stack 126 of hypervisor 120 and the reprocessed IOs are issued, for example, through an HBA to a storage system. IOs issued by guest OS 115 installed on virtual 106 operate in a similar manner as IOs issued by guest OS 114. Similarly, IOs issued by guest OS 116 and guest 117 through the native file system layer appear to guest OS 116 and guest OS 117 as being routed to one or more virtual disks provisioned for virtual machines 107 and 108, respectively, for final execution, but such IOs are, in reality, reprocessed by IO stack 127 of hypervisor 121.

Virtual machine monitors (VMM) 122 and 123 may be considered separate virtualization components between the virtual machines and hypervisor 120 (which, in such a conception, may itself be considered a virtualization "kernel" component) since there exists a separate VMM for each instantiated VM. Similarly, VMM 124 and VMM 125 are separate virtualization components between the virtual machines and hypervisor 121. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

In various embodiments, SDN manager 140 provides control for logical networking services such as a logical firewall, logical load balancing, logical virtual private networking (VPN), and logical switching. In some embodiments, SDN manager 140 is able to create and manage logical objects of a virtual network. SDN manager 140 may also be able to access other logical objects that were not created by SDN manager 140 (e.g., virtual machine 105). In accordance with various embodiments, workloads are communicated over a virtual network. A workload, as used herein, is an abstraction of the work that an application instance or a set of applications instances are to perform. For example, a workload may include implementing a web server, implementing a web server farm, implementing a multilayer application, etc.

In various embodiments, a virtual network, using at least one of hypervisor 120 and 121, reproduces the Layer 2 through Layer 7 networking services (e.g., switching, routing, access control, firewalling, quality of service (QoS), and load balancing) as logical objects. Accordingly, these networking services can be programmatically assembled (e.g., by a networking administrator) in any combination, to produce individual virtual networks. Virtual networks are independent of underlying network hardware (e.g., physical computing resources 130 and 131), allowing for network hardware to be treated as a networking resource pool that can be allocated and repurposed as needed.

SDN manager 140 is configured to access, manage and otherwise utilize logical objects. These logical objects may be classified as managed logical objects and non-managed logical objects. A managed logical object is a logical object whose lifecycle is managed by SDN manager 140, where lifecycle refers to creation, updating and deletion of the managed logical object. Examples of managed logical objects include representations of logical switches, logical routers, logical load balancers, and logical firewalls including firewall rules, firewall sections (collection of firewall rules), etc.

A logical switch creates logical broadcast domains or segments to which an application or tenant VM can be logically wired. A logical switch provides the characteristics of a physical networks broadcast domains. In some embodiments, a logical switch is distributed and can span arbitrarily large compute clusters. For example, allowing for VM mobility within the datacenter without limitations of the physical Layer 2 boundary. A logical router provides the necessary forwarding information between Layer 2 broadcast domains.

A logical load balancer enables high-availability service and distributes the network traffic load among multiple servers. In some embodiments, a logical load balancer distributes incoming service requests evenly among multiple servers in such a way that the load distribution is transparent to users. Load balancing thus helps in achieving optimal resource utilization, maximizing throughput, minimizing response time, and avoiding overload.

A logical firewall provides security mechanisms for dynamic virtual data centers. In one embodiment, the logical firewall is a distributed firewall (DFW) that allows for increased granularity of firewall control. In general, DFWs provide network access control at the data end node level rather than a centralized choke point. For instance, distributed firewalls can be implemented as a virtual network interface card (vNIC) level firewall. For example, vNIC level firewalls are able to enforce security policies as soon as a packet comes out of a VM's vNIC. Therefore, distributed firewalls are able to provide security for intra-VM traffic. VNIC level firewalls can also inspect the traffic twice, once at source and once at destination. A logical firewall includes or refers to other logical objects, such as a firewall rules, firewall sections (groups of firewall rules), IP sets (groups of IP addresses impacted by a firewall rule), VM groups, etc.

A non-managed logical object is a logical object whose lifecycle is not managed in SDN 100. Non-managed logical objects may be imported from different domains into SDN 100. A non-managed logical object may be consumed into SDN 100 by augmenting the managed logical objects or by exposing relationships between the imported logical objects and the managed logical objects. For example, a transport node is a logical object that may not be completely managed by SDN 100. A hypervisor or a top of rack (ToR) switch may act as transport node and can be augmented with attributes from SDN 100, but is managed outside the scope of SDN 100. Other examples of non-managed logical objects include a VM, a vNIC, or an Active Directory (AD) group imported from another domain and referencing, referenced by, or having a relationship with other logical objects such as a logical firewall, a logical port, etc.

Logical objects (managed or non-managed) within SDN 100 can have relationship with other logical objects. A relationship can be represented by two nodes on the either side of an edge. In accordance with various embodiments, any logical object can create a relationship with another entity. These relationships can be classified as a weak relationship or a strong relationship. The strong and weak nature of the relationship dictates how the overall system determines whether to allow a delete operation to succeed or fail for a given logical object.

A strong relationship represents a relationship between two logical objects such that one logical object cannot survive without other logical object. For example, a distributed network encryption (DNE) rule section and DNE key policy logical objects have a strong relationship. A DNE rule section is unable to exist without a DNE key policy. Accordingly, if a DNE key policy is deleted and a DNE rule section has no other referenced DNE key policy, the DNE rules section will also be deleted. For logical objects having a strong relationship, deletion of a logical object for which strong relationship exists in the system may not be permitted. Another example of a strong relationship is a virtual interface (VIF) to logical port relationship. In the current example, a logical port deletion should not be allowed if there is a VIF entity attached to the logical port. In some embodiments, a strong relationship refers to a relationship where deletion of a logical object would have a cascading impact on the referenced or referencing logical objects. In various embodiments, a system may not allow for the deletion of a logical object having a strong relationship with another logical object.

A weak relationship represents a relationship between two logical objects such that one logical object can survive without other logical object. An example of this is a firewall rule and a logical port. A firewall rule can reference a logical port though they have weak relationship as the lifecycle is managed by different domains (e.g., by different administrators). In some embodiments, a system default behavior is same as the behavior for a strong relationship, meaning that deletion of a logical object which has a weak relationship with another logical object is not allowed. However, in some systems this behavior can be overridden by user choice. In other words, if a user attempts to delete a logical port, the system may disallow the delete operation if it is referenced in a firewall rule. However, the user may still choose to override and delete the logical port.

If the lifecycle of a logical object is not managed in SDN 100, SDN 100 has no control on the lifecycle of the logical object. For example, a VM logical object exists in a compute manager (e.g., VMware's vCenter) such that the lifecycle is managed by the compute manager rather than SDN manager 140. In another example, a firewall rule logical object has a relationship with an IP set logical object, where an IP set defines a set of IP addresses for which the firewall rule is applied. If the IP set is deleted, the firewall rule referencing the IP set has an invalid reference. To cure the invalid reference, corrective action must take place. Moreover, if the IP set is permanently deleted, it can be difficult to take corrective action as the data and information about which IP set was deleted in no longer available.

Moreover, even if two logical objects having a weak relationship are managed resources within the same domain (e.g., its lifecycle is managed in SDN 100), the logical objects may be managed by different administrator (e.g., security and network administrators). For example, the network administrators might decide to delete a logical port but the firewall configuration referencing that logical port cannot be cleared. To ensure network security, a firewall configuration (e.g., a security configuration) may not be deleted without an explicit delete operation from security administrator.

In conventional SDNs, logical objects may be deleted while they are still referenced by other logical objects. The deletion may result in inconsistencies in the system, e.g., with respect to the network configuration, the security configuration, system operations, and realization of a desired state. Accordingly, embodiments described herein provide for determining an effective realized state accounting for the deleted logical object, notification of anomalies in the desired state, audit logs for system operations, and restoration of a deleted logical object.

Figure 2:
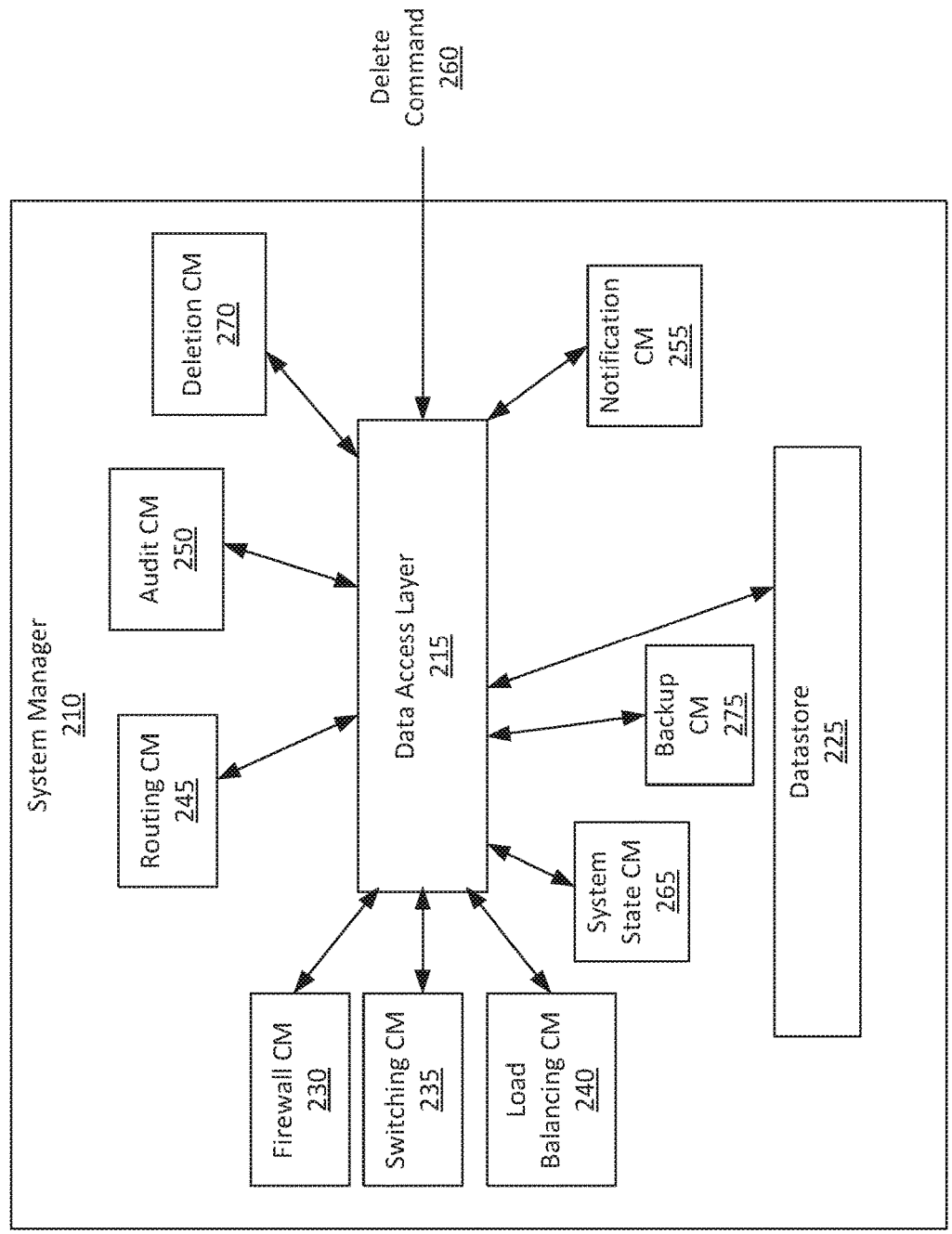
FIG. 2 shows an example system manager, in accordance with various embodiments.

FIG. 2 shows an example system manager 210, in accordance with various embodiments. System manager 210 is used to manage operations of a managed system and provides for configuration management for components of the managed system. In one embodiment, system manager 210 is an SDN manager (e.g., SDN 140 of FIG. 1) and is used to manage virtualized networking operations and provides configuration management for components (e.g., hosts, virtual servers, VMs, data end nodes, etc.) of the virtualized environment. Logical objects are system components used by system manager 210 in managing the virtual environment (e.g., for managing a virtual network). Logical objects may be managed, such that the life cycle of the logical object is controlled by system manager 210, or non-managed, such that the life cycle of the logical object is not managed by system manager 210.

System manager 210 includes datastore 225 for storing data including logical objects and data associated with the logical objects, data access layer 215 for providing access to data stored in datastore 225, and a number of modules for performing various operations. As illustrated, system manager 210 includes firewall configuration manager 230, switching configuration manager 235, load balancing configuration manager 240, routing configuration manager 245, audit configuration manager 250, notification configuration manager 255, system state configuration manager 265 and backup configuration manager 275. However, it should be appreciated that system manager 210 may include other modules or configuration managers performing other networking operations, as well as other non-networking operations, and that the modules are not intended to be limited to the described examples.

In accordance with various embodiments, modules of system manager 210 manage the use of logical objects accessible by system manager 210. For example, firewall configuration manager 230 is configured to generate firewall rule logical objects, where the firewall rule references and/or is referenced by other logical objects, such as IP sets or VM groupings.

In various embodiments, datastore 225 maintains instances of the logical objects accessible to system manager 210. It should be appreciated that datastore 225 may include managed and non-managed logical objects. The logical objects maintained in datastore 225 are subject to deletion, either by system manager 210 or by another management control in another domain.

Upon receipt of a delete command 260 (e.g., a request to delete) a logical object, data access layer 215 initiates a delete operation from datastore 225. The delete operation marks the logical object for deletion, such that the logical object is unavailable for reference by other logical objects. However, the logical object is maintained in datastore 225 for access and/or consumption of data by modules of system manager 210, such that memory space that is occupied by the logical object is unavailable for any other use by system manager 210.

In one embodiment, upon initiation of the delete operation marking the logical object for deletion, notification configuration manager 255 generates a system notification that the logical object has been marked for deletion. The system notification is broadcast to the modules of system manager 210. For example, an IP set logical object referenced by a firewall rule is marked for deletion. Upon receiving the system notification that an IP set was deleted, firewall configuration manager 230 identifies that a firewall rule referenced the deleted IP set. In one embodiment, firewall configuration manager 230 can instantiate audit configuration manager 250 to perform an audit of the deleted IP set. Audit configuration manager 250 can then access the logical object marked for deletion and data associated with the logical object marked for deletion to obtain the required information for performing an audit and generate an audit log. The audit log including the logical object marked for deletion provides information for a security administrator to take corrective action by identifying the details of the deleted IP set. In other words, the audit configuration manager 250 is able to determine a complete audit trail of the deleted IP set by consuming the data associated with the deleted IP set, as the data is still available for consumption by modules of system manager 210.

In one embodiment, system manager 210 also includes a deletion configuration manager 270 for managing the deletion of logical objects marked for deletion and maintained in datastore 225. Deletion configuration manager 270 can monitor datastore 225 and logical objects within datastore 225 marked for deletion. Upon satisfaction of a deletion condition, the logical object and data associated with the logical object can be permanently deleted from datastore 225. In one embodiment, the deletion condition is the lapsing of a time period since the logical object was marked for deletion. For example, once a predetermined time period has elapsed since the logical object was marked for deletion, the logical object marked for deletion is permanently deleted from datastore 225.

In another embodiment, the deletion condition includes a number of logical objects of the virtualization infrastructure exceeding a threshold value and the logical object being oldest of the logical objects of the virtualization infrastructure. For example, datastore 225 may only allow for the storage and maintenance of a limited number of logical objects (e.g., 10,000). Upon exceeding a threshold value (e.g., 8000 where total capacity is 10,000), the oldest logical object marked for deletion is permanently deleted from datastore 225.

In other embodiments, the logical objects marked for deletion are weighted according to various factors, and the weighted values are also factors in the deletion. In some such embodiment, the deletion condition includes a number of logical objects of the virtualization infrastructure exceeding a threshold value and the logical object having lowest weighted value of the logical objects of the virtualization infrastructure.

In one embodiment, a weighted value of the logical object is based at least in part on the module for accessing the logical object. For example, logical objects related to security may have a higher weighting than logical objects related to routing. Accordingly, continuing with this example, a firewall rule logical object or an IP set logical object (e.g., used by firewall configuration manager 230) may be weighted higher than a logical router logical object (e.g., used by routing configuration manager 245).

In another embodiment, a weighted value of the logical object is based at least in part on a number of references to the logical object by other logical objects of the virtualization infrastructure. For example, if a first logical object marked for deletion is referred to by a larger number of logical objects than a second logical object marked for deletion, the first logical object may be weighted higher than the second logical object.

It should be appreciated that other deletion conditions or methods for deleting logical objects from datastore 225 may be used, and that deletion conditions or methods for deleting logical objects from datastore 225 are not intended to be limited to the described examples.

Figure 3:
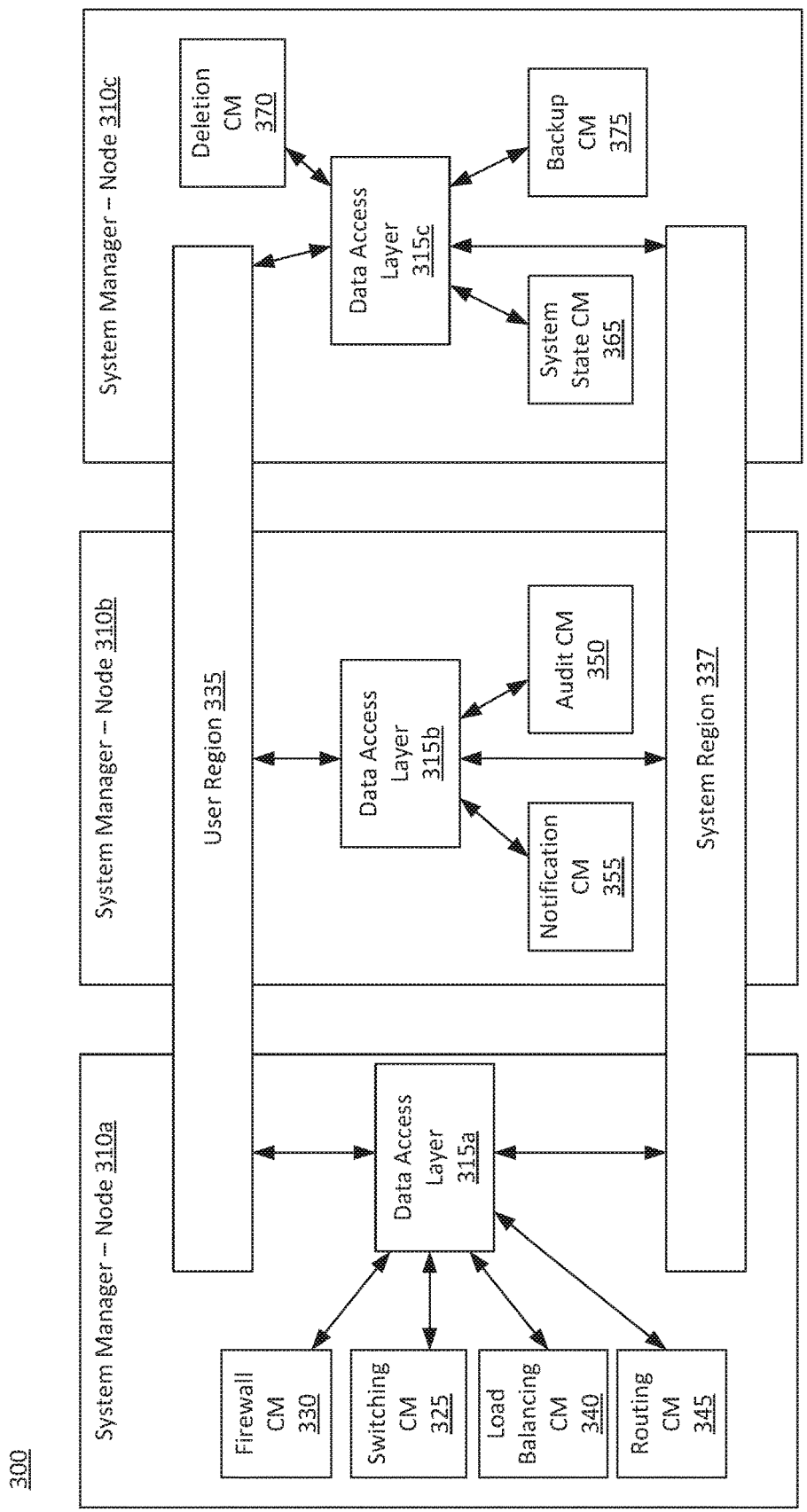
FIG. 3 shows an example multi-node system manager, in accordance with various embodiments.

FIG. 3 shows an example multi-node system manager 300, in accordance with various embodiments. System manager 300 is used to manage operations of a managed system and provides for configuration management for components of the managed system and operates in a similar manner as system manager 210 of FIG. 2. In one embodiment, system manager 300 is an SDN manager (e.g., SDN 140 of FIG. 1) and is used to manage virtualized networking operations and provides configuration management for components (e.g., hosts, virtual servers, VMs, data end nodes, etc.) of the virtualized environment. System manager 300 uses logical objects to manage a virtual environment (e.g., for managing a virtual network), and the logical objects may be managed or non-managed.

System manager 300 is distributed across three nodes 310a-c and includes user region 335 and system region 337 for storing data including logical objects and data associated with the logical objects, the user region 335 and system region 337 spanning nodes 310a-c. In one embodiment, user region 335 is implemented in hardware as volatile memory (e.g., random access memory (RAM)) and system region 337 is implemented in hardware as a persistent data storage device (e.g., read only memory (ROM), magnetic or optical disc drive). System manager 300 also includes data access layer 315a-c for providing access to data stored in user region 335 and system region 337, and a number of modules for performing various operations. As illustrated, system manager 300 includes firewall configuration manager 330, switching configuration manager 325, load balancing configuration manager 340, routing configuration manager 345, audit configuration manager 350, notification configuration manager 355, system state configuration manager 365 and backup configuration manager 375. However, it should be appreciated that system manager 300 may include other modules or configuration managers performing other networking operations, as well as other non-networking operations, and that the modules are not intended to be limited to the described examples. Moreover, it should be appreciated that while particular modules are shown in particular nodes, any module can reside within any node, or within multiple nodes. It should also be appreciated that system manager 300 can include any number of nodes.

In accordance with various embodiments, modules of system manager 300 manage the use of logical objects accessible by system manager 300. For example, firewall configuration manager 330 is configured to generate firewall rule logical objects, where the firewall rule references and/or is referenced by other logical objects, such as IP sets or VM groupings.

In various embodiments, user region 335 and system region 337 maintains instances of the logical objects accessible to system manager 300. While operational, data access layer 315a-c maintains consistency between the instances of logical objects in both user region 335 and system region 337 such that a logical object is maintained in both user region 335 and system region 337. It should be appreciated that user region 335 and system region 337 may include managed and non-managed logical objects. The logical objects maintained in user region 335 and system region 337 are subject to deletion, either by system manager 300 or by another management control in another domain.

Upon receipt of a delete command (e.g., a request to delete) a logical object, data access layer 315a-c initiates a delete operation from user region 335 and system region 337. The delete operation marks the logical object for deletion, such that the logical object is unavailable for reference by other logical objects. Moreover, in accordance with one embodiment, the instance of the logical object is deleted from the user region 335 and is maintained in system region 337 for access and/or consumption of data by modules of system manager 300, such that the memory space that is occupied by the logical object is unavailable for any other use by system manager 300.

In one embodiment, upon initiation of the delete operation marking the logical object for deletion, notification configuration manager 355 generates a system notification that the logical object has been marked for deletion such that it is deleted from user region 335 and maintained in system region 337. The system notification is broadcast to the modules of system manager 300. For example, an IP set logical object referenced by a firewall rule is marked for deletion. Upon receiving the system notification that an IP set was deleted, firewall configuration manager 330 identifies that a firewall rule referenced the deleted IP set. In one embodiment, firewall configuration manager 330 can instantiate audit configuration manager 350 to perform an audit of the deleted IP set. Audit configuration manager 350 can then access the logical object marked for deletion and data associated with the logical object marked for deletion to obtain the required information for performing an audit and generate an audit log. The audit log including the logical object marked for deletion provides information for a security administrator to take corrective action by identifying the details of the deleted IP set. In other words, the audit configuration manager 350 is able to determine a complete audit trail of the deleted IP set by consuming the data associated with the deleted IP set, as the data is still available for consumption by modules of system manager 300.

In one embodiment, system manager 300 also includes a deletion configuration manager 370 for managing the deletion of logical objects marked for deletion and maintained in system region 337. Deletion configuration manager 370 can monitor system region 337 and logical objects within system region 337 marked for deletion. Upon satisfaction of a deletion condition, the logical object and data associated with the logical object can be permanently deleted from system region 337. In one embodiment, the deletion condition is the lapsing of a time period since the logical object was marked for deletion. For example, once a predetermined time period has elapsed since the logical object was marked for deletion, the logical object marked for deletion is permanently deleted from system region 337. Deletion configuration manager 370 operates in a similar manner as deletion configuration manager 270 of FIG. 2.

Figure 4:
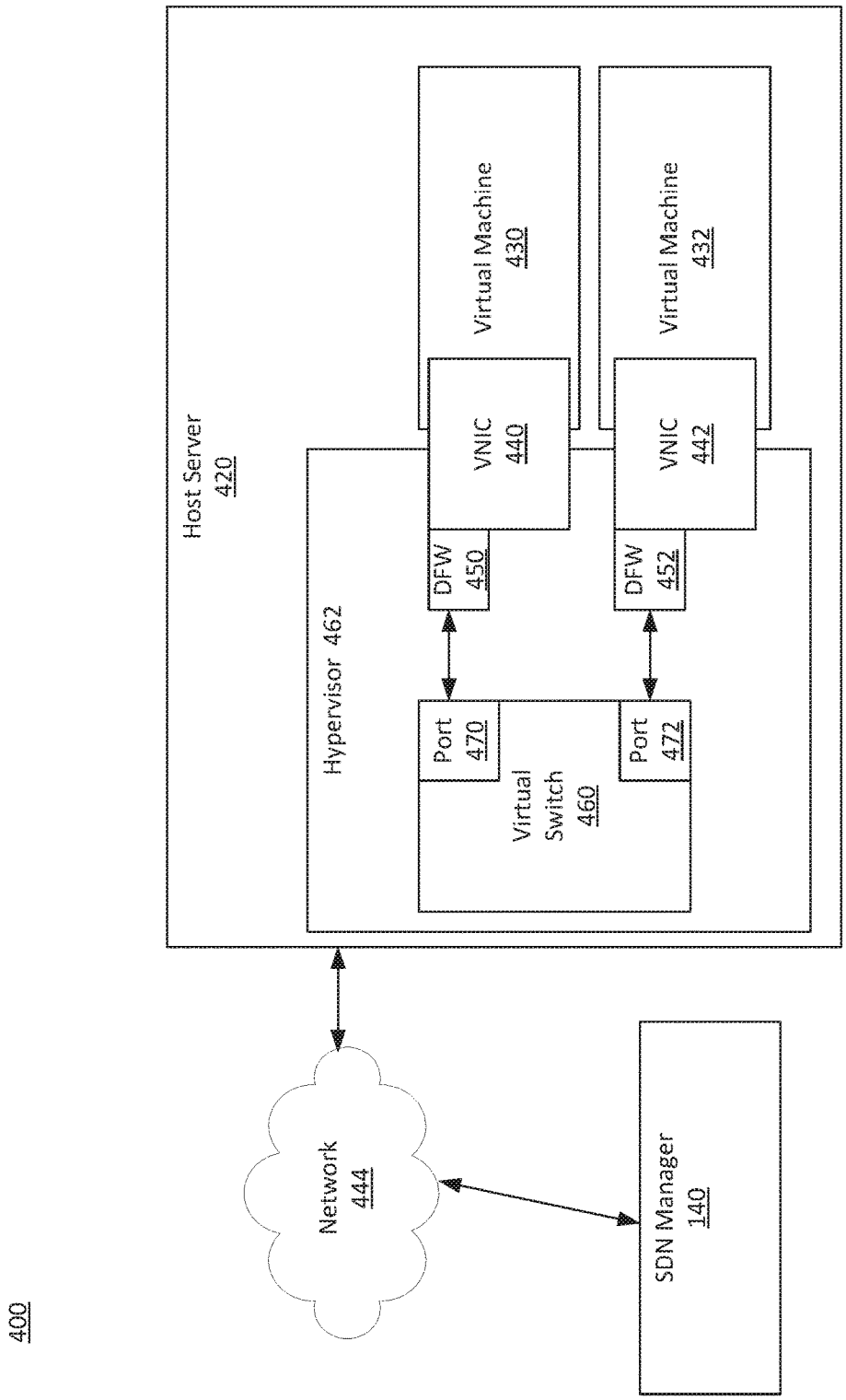
FIG. 4 shows an example virtual network including logical objects, in accordance with various embodiments.

FIG. 4 shows an example virtual network 400 including logical objects, in accordance with various embodiments. As illustrated, virtual network 400 includes SDN manager 140, host server 420, VM 430, VM 432, and network 444, where VM 430 and VM 432 are logical objects. In some embodiments, the VMs execute on top of hypervisor 462 that is executing on host server 420. FIG. 4 illustrates just two VMs 430 and 432, but a larger number of VMs execute on the host server 420 in some cases. Each VM may belong to one tenant or to multiple tenants when the host operates in a multi-tenant environment.

As illustrated, VM 430 includes vNIC 440 and VM 432 includes vNIC 442, wherein vNIC 440 and vNIC 442 are logical objects. It should be appreciated that the VMs can include any number of vNICs. A distributed firewall is located between each vNIC and the respective port of virtual switch 460. As illustrated, distributed firewall (DFW) 450 is communicatively coupled with vNIC 440 and logical port 470 and DFW component 452 is communicatively coupled with vNIC 442 and logical port 472. DFW components 450 and 452 are logical objects for enforcing the firewall rules of the distributed firewall. In various embodiments, host server 420 receives firewall rules (represented as logical objects) from system manager 210 or another firewall management node (not illustrated) and, based on these rules, perform vNIC-level firewall operations on packets sent by, and received for, VMs 430 and 432.

Each vNIC of the VM is responsible for exchanging packets between the VM and the virtual switch 460. As further described below, each vNIC connects to a particular logical port of the virtual switch 460, which connects to a physical network interface card (NIC) (not shown) for communicatively coupling with network 444. In some embodiments, the vNICs are software abstractions of a physical NIC that are implemented by hypervisor 462. In some embodiments, the virtual switch 460 and the DFW components 450 and 452 operate in the kernel space. It should be appreciated that a host server can include one or more logical switches, and that these logical switches can be designated on a cluster basis, depending on the implementation.

In some embodiments, the virtual switch 460 maintains a single port for each vNIC of each VM. For instance, for vNICs 440 and 442, the virtual switch 460 includes ports 470 and 472, respectively. The virtual switch 460 performs packet-processing operations to forward packets that it receives on one of its ports to another one of its ports. For example, in some embodiments, the virtual switch 460 tries to use data in the packet (e.g., data in the packet header) to match a packet to flow based rules, and upon finding a match, to perform the action specified by the matching rule. In some embodiments, the virtual switch 460 connects to a physical NIC (through a NIC driver (not shown)) to send outgoing packets and to receive incoming packets. In some embodiments, the virtual switch 460 is defined to include a port (not shown) that connects to the physical NIC's driver to send and receive packets to and from the NIC.

In some embodiments, the ports of the virtual switch 460 include one or more function calls to one or more modules that implement special input/output operations on incoming and outgoing packets that are received at the ports. One of these function calls is to the distributed firewall component, which performs in some embodiments firewall operations on incoming and/or outgoing packets (e.g., on packets that are received by the host for one of the VMs or on packets that are sent by one of the VMs).

The distributed firewall can be called (e.g., by a port 470 or 472 of the virtual switch 460) for incoming or outgoing packets to check whether such packets should be delivered to a VM or sent from a VM based on vNIC-level firewall rules. In some embodiments, the distributed firewall component can be called by the port that connects to the physical NIC's driver (e.g., for incoming packets).

Example Methods of Operation

Figure 5A:
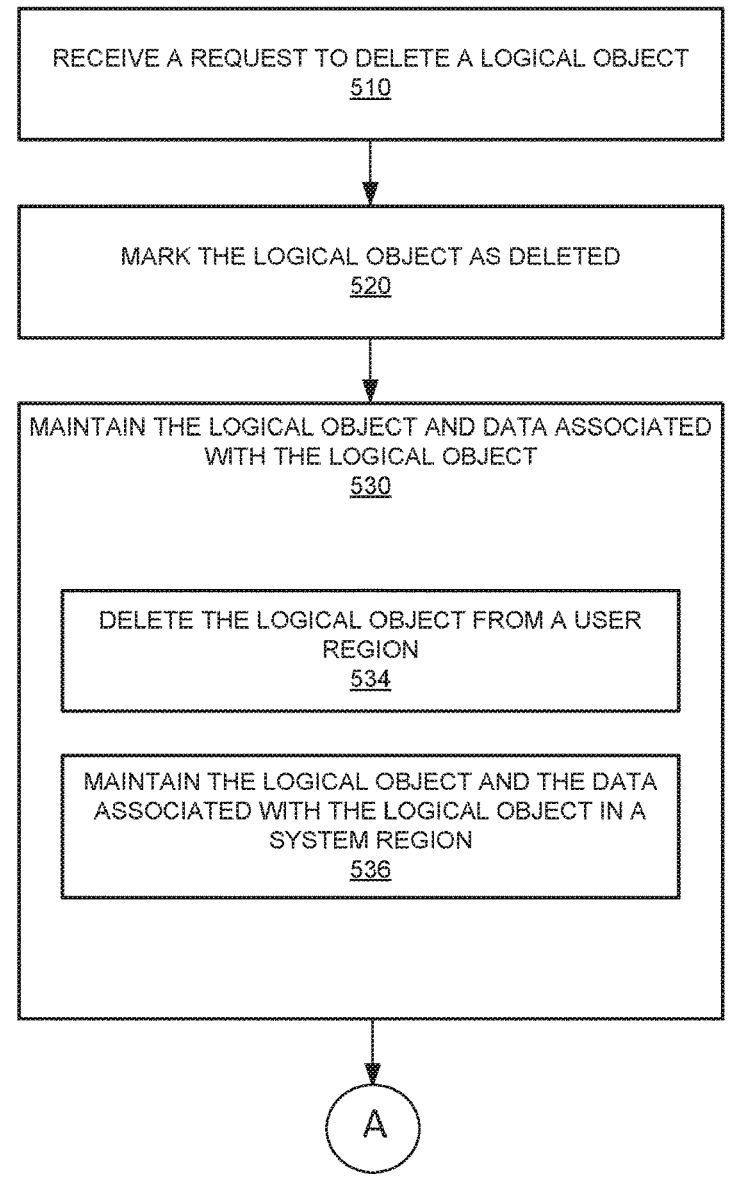
FIGS. 5A and 5B illustrate a flow diagram of an example method for managing deletion of a logical object, according to various embodiments.
Figure 5B:
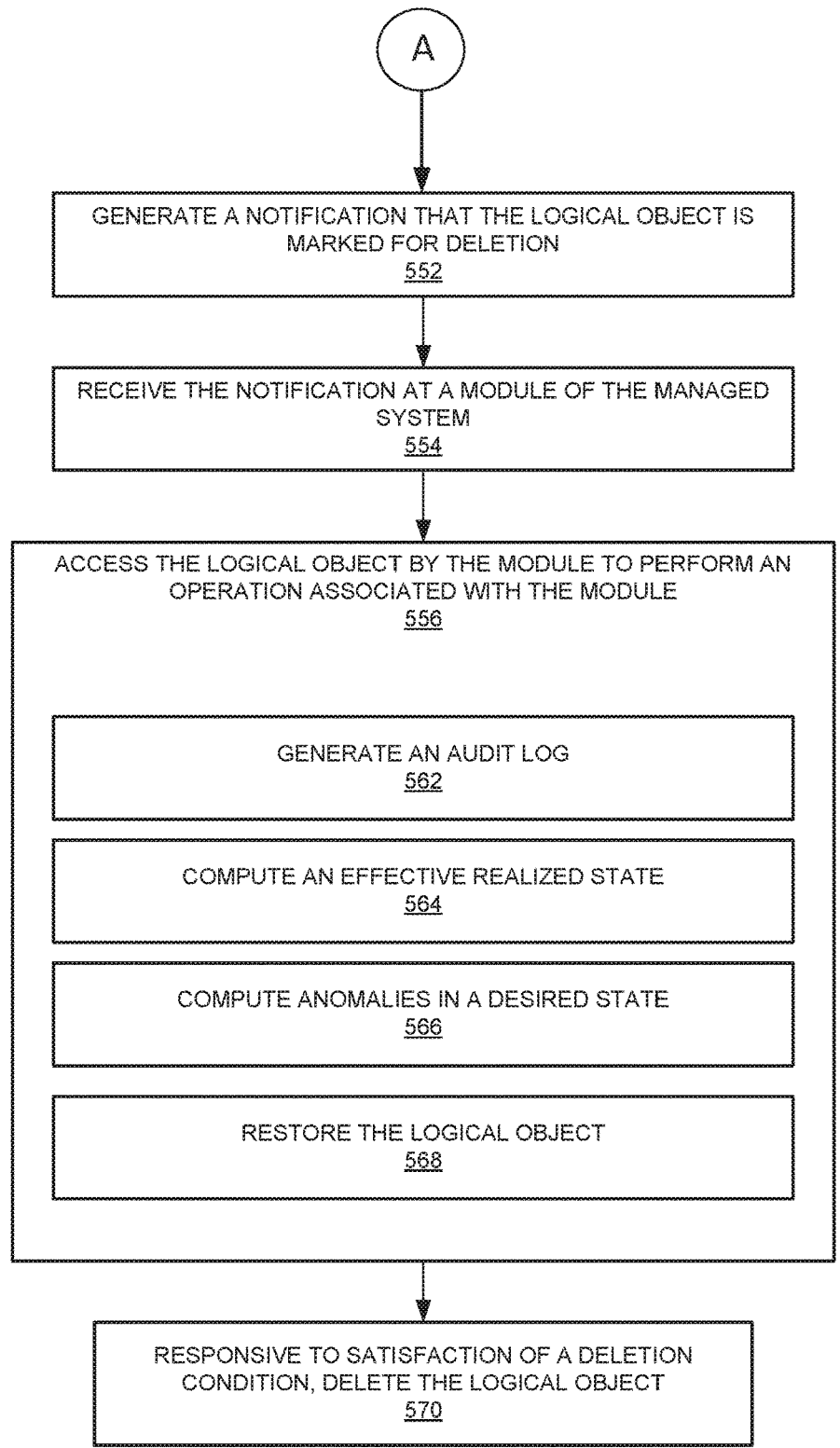

FIGS. 5A and 5B shows a flow diagram 500 of an example method for managing deletion of a logical object, in accordance with various embodiments. Procedures of this method will be described with reference to elements and/or components of FIGS. 1-4. It is appreciated that in some embodiments, the procedures may be performed in a different order than described, that some of the described procedures may not be performed, and/or that one or more additional procedures to those described may be performed. Flow diagram 500 includes some procedures that, in various embodiments, are carried out by one or more processors under the control of computer-readable and computer-executable instructions that are stored on non-transitory computer-readable storage media. It is further appreciated that one or more procedures described in flow diagram 500 may be implemented in hardware, or a combination of hardware with firmware and/or software.

At procedure 510, a request to delete a logical object of a managed system is received, wherein the logical object is referenced by a second logical object, and wherein deletion of the logical object does not result in deletion of the second logical object. At procedure 520, the logical object is marked as deleted such that the logical object is unavailable for reference by the second logical object. At procedure 530, the logical object and data associated with the logical object are maintained in a memory space of the managed system for access by a module (e.g., configuration manager) of the managed system (e.g., at datastore 225 or system region 337), such that the memory space is unavailable for any other use by the managed system.

In one embodiment, as shown at procedure 534, maintaining the logical object and data associated with the logical object in a memory space of the managed system for access by the module of the managed system includes deleting the logical object from a user region (e.g., user region 335)

associated with the managed system. As shown at procedure 536, the logical object and the data associated with the logical object are maintained in a system region (e.g., system region 337) associated with the managed system. In one embodiment, the managed system includes a plurality of nodes (e.g., nodes 310*a-c*), where a node of the plurality of nodes is configured to host at least one module of a plurality of modules, and the user region and the system region are accessible across the plurality of nodes by the plurality of modules via a data access layer.

With reference to FIG. 5B, in one embodiment, at procedure 552 of flow diagram 500, a notification that the logical object is marked for deletion is generated, wherein the notification is for consumption by the module of the managed system. At procedure 554, the notification is received at the module of the managed system.

In one embodiment, as shown at procedure 556, the logical object is accessed by the module for performing an operation associated with the module. In one embodiment, as shown at procedure 562, in which the module is an audit configuration manager (e.g. audit configuration manager 250 or audit configuration manager 350), the logical object and the data associated with the logical object are accessed to generate an audit log including the logical object and the data associated with the logical object. In one embodiment, as shown at procedure 564, in which the module is a system state configuration manager (e.g. system state configuration manager 265 or system state configuration manager 365), the logical object and the data associated with the logical object are accessed to compute an effective realized state of the managed system using the logical object and the data associated with the logical object. In one embodiment, as shown at procedure 566, in which the module is a system state configuration manager, the logical object and the data associated with the logical object are accessed to compute anomalies in a desired state of the managed system using the logical object and the data associated with the logical object. In one embodiment, as shown at procedure 568, in which the module is a data backup configuration manager (e.g. backup configuration manager 275 or backup configuration manager 375), the logical object and the data associated with the logical object.

In one embodiment, as shown at procedure 570, responsive to satisfaction of a deletion condition, the logical object and data associated with the logical object are deleted from the managed system such that the memory space is available for other use by the managed system. In one embodiment, the deletion condition includes a number of logical objects of the managed system exceeding a threshold value and the logical object being oldest of the logical objects of the managed system. In one embodiment, the deletion condition includes a number of logical objects of the managed system exceeding a threshold value and the logical object having lowest weighted value of the logical objects of the managed system. In one embodiment, a weighted value of the logical object is based at least in part on the module for accessing the logical object. In one embodiment, a weighted value of the logical object is based at least in part on a number of references to the logical object by other logical objects of the managed system.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A system manager for managing logical objects, wherein each logical object corresponds to one or more related configuration settings in a managed system, the system manager implementing a method for managing deletion of logical objects, the method comprising:
   receiving a request to delete a logical object of a managed system, wherein the logical object is stored in a memory space of a user region datastore accessible by the system manager, wherein the logical object is referenced by a second logical object, and wherein deletion of the logical object does not result in deletion of the second logical object;
   in response to the request to delete the logical object, marking the logical object as deleted such that the logical object is unavailable for access by the second logical object and other logical objects; and
   maintaining the logical object and data associated with the logical object for access by the system manager of the managed system, wherein the maintaining the logical object and data associated with the logical object for access by the system manager comprises:
      deleting the logical object from the user region datastore associated with the managed system such that the logical object is unavailable for reference by the second logical object and other logical objects; and
      maintaining the logical object and the data associated with the logical object in a memory space of a system region datastore for access by the system manager of the managed system.

2. The method of claim 1, wherein the managed system comprises a plurality of nodes, wherein a node of the plurality of nodes is configured to host at least one module of a plurality of modules, and wherein the user region datastore and the system region datastore are accessible across the plurality of nodes by the plurality of modules via a data access layer.

3. The method of claim 1, further comprising:
   generating a notification that the logical object is marked for deletion, wherein the notification is for consumption by a module of the managed system; and
   receiving the notification at the module of the managed system.

4. The method of claim 1, further comprising:
   accessing the logical object by a module for performing an operation associated with the module.

5. The method of claim 4, wherein the module is an audit configuration manager, the method further comprising:

accessing the logical object and the data associated with the logical object to generate an audit log comprising the logical object and the data associated with the logical object.

6. The method of claim 4, wherein the module is a system state configuration manager, the method further comprising:
accessing the logical object and the data associated with the logical object to compute an effective realized state of the managed system using the logical object and the data associated with the logical object.

7. The method of claim 4, wherein the module is a system state configuration manager, the method further comprising:
accessing the logical object and the data associated with the logical object to compute anomalies in a desired state of the managed system using the logical object and the data associated with the logical object.

8. The method of claim 1, further comprising:
restoring the logical object and the data associated with the logical object.

9. The method of claim 1, further comprising:
responsive to satisfaction of a deletion condition, deleting the logical object and data associated with the logical object from the system region datastore of the managed system such that the memory space of the system region datastore is available for other use by the managed system.

10. The method of claim 9, wherein the deletion condition comprises:
a number of logical objects of the managed system exceeding a threshold value and the logical object being oldest of the logical objects of the managed system.

11. The method of claim 9, wherein the deletion condition comprises:
a number of logical objects of the managed system exceeding a threshold value and the logical object having lowest weighted value of the logical objects of the managed system.

12. The method of claim 11, wherein a weighted value of the logical object is based at least in part on a module for accessing the logical object.

13. The method of claim 11, wherein a weighted value of the logical object is based at least in part on a number of references to the logical object by other logical objects of the managed system.

14. A non-transitory computer readable storage medium having computer readable program code stored thereon for causing a computer system to perform a method for managing deletion of logical objects, wherein each logical object corresponds to one or more related configuration settings in a managed system, the method comprising:
receiving a request to delete a logical object of a managed system, wherein the logical object is stored in a memory space of a user region datastore accessible by a system manager of the managed system, wherein the logical object is referenced by a second logical object, and wherein deletion of the logical object does not result in deletion of the second logical object;
in response to the request to delete the logical object, marking the logical object as deleted such that the logical object is unavailable for access by the second logical object and other logical objects; and
maintaining the logical object and data associated with the logical object for access by the system manager of the managed system, wherein the maintaining the logical object and data associated with the logical object for access by the system manager comprises:
deleting the logical object from the user region datastore associated with the managed system such that the logical object is unavailable for reference by the second logical object and other logical objects; and
maintaining the logical object and the data associated with the logical object in a memory space of a system region datastore for access by the system manager of the managed system.

15. The non-transitory computer readable storage medium of claim 14, the method further comprising:
accessing the logical object by a module for performing an operation associated with the module.

16. The non-transitory computer readable storage medium of claim 14, the method further comprising, further comprising:
responsive to satisfaction of a deletion condition, deleting the logical object and data associated with the logical object from the system region datastore of the managed system such that the memory space the system region datastore of is available for other use by the managed system.

17. A computer system comprising:
a data storage unit; and
a processor coupled with the data storage unit, the processor for executing a system manager for managing logical objects, wherein each logical object corresponds to one or more related configuration settings in a managed system, the processor configured to:
receive a request to delete a logical object of a managed system, wherein the logical object is stored in a memory space of a user region datastore accessible by the system manager, wherein the logical object is referenced by a second logical object, and wherein deletion of the logical object does not result in deletion of the second logical object;
in response to the request to delete the logical object, mark the logical object as deleted such that the logical object is unavailable for access by the second logical object and other logical objects; and
maintain the logical object and data associated with the logical object for access by the system manager of the managed system, wherein the logical object is deleted from the user region datastore associated with the managed system such that the logical object is unavailable for reference by the second logical object and other logical objects, and wherein the logical object and the data associated with the logical object is maintained in a memory space of a system region datastore for access by the system manager of the managed system.

18. The computer system of claim 17, wherein the processor is further configured to:
delete the logical object and data associated with the logical object from the system region datastore of the managed system responsive to satisfaction of a deletion condition such that the memory space the system region datastore of is available for other use by the managed system.

* * * * *